United States Patent [19]

Mohl et al.

[11] 4,403,527
[45] Sep. 13, 1983

[54] APPARATUS FOR DECREASING JOLTS DURING GEAR SHIFTS IN AUTOMATIC TRANSMISSIONS IN MOTOR VEHICLES

[75] Inventors: Helmut Mohl, Schwieberdingen; Alfred Müller, Leonberg; Manfred Schwab, Gerlingen; Walter Stroh, Cleebronn, all of Fed. Rep. of Germany

[73] Assignee: Robert Bosch GmbH, Stuttgart, Fed. Rep. of Germany

[21] Appl. No.: 172,239

[22] Filed: Jul. 25, 1980

[30] Foreign Application Priority Data

Sep. 6, 1979 [DE] Fed. Rep. of Germany ....... 2935916

[51] Int. Cl.³ .............................................. B60K 41/06
[52] U.S. Cl. ........................................ 74/851; 74/858; 74/866; 74/872
[58] Field of Search ................. 74/872, 874, 866, 843, 74/851, 858; 192/0.058, 0.062

[56] References Cited

U.S. PATENT DOCUMENTS

| 2,741,350 | 4/1956 | Dodge | 74/851 X |
| 3,327,553 | 6/1967 | Peras | 74/858 |
| 3,712,156 | 1/1973 | Kuhnle | 74/858 |
| 3,763,720 | 10/1973 | Aono et al. | 74/866 X |
| 4,217,795 | 8/1980 | Sugasawa et al. | 74/858 |
| 4,266,447 | 5/1981 | Heess et al. | 74/852 X |
| 4,267,750 | 5/1981 | Espenschied et al. | 74/866 |

Primary Examiner—Rodney H. Bonck
Attorney, Agent, or Firm—Frishauf, Holtz, Goodman & Woodward

[57] ABSTRACT

The automatic transmission control unit in a motor vehicle furnishes a signal which signifies that motor torque is to be decreased, thereby decreasing jolts or wear on friction elements in the transmission. In response to this signal, the input or output signals of a motor control unit, for example either an ignition control stage or an injection control stage, are changed in such a way that the motor torque will be decreased. Circuits for delaying ignition timing, shortening the pulse width of injection pulses, etc. are disclosed. The present invention is essentially an adapter unit so that the desired decrease in motor torque can be effected with the injection or ignition timing units already present in the motor vehicle.

10 Claims, 14 Drawing Figures

APPARATUS FOR DECREASING JOLTS DURING GEAR SHIFTS IN AUTOMATIC TRANSMISSIONS IN MOTOR VEHICLES

CROSS REFERENCE TO RELATED APPLICATION

U.S. application Ser. No. 089,465 (G Heess et al) filed Oct. 30, 1979 now U.S. Pat. No. 4,266,447, and assigned to the same assignee.

This application is hereby incorporated by reference into the present application.

The present invention relates to the drive systems of motor vehicles and, more particularly, to drive systems having a motor, a motor control unit controlling the operating parameters of the drive motor, an automatic transmission, and a transmission control unit controlling the operation of the latter.

BACKGROUND AND PRIOR ART

In known drive systems, the motor control unit may, for example, be an ignition control unit which operates without interrupter. In another known drive system, the motor control unit is a unit controlling the injection process, that is the amount of fuel injected during each cycle is matched to the then-present operating conditions. The known motor control units are generally used in automobiles which have a manual transmission. However, automatic transmissions may also be used. The transmission control unit associated with such an automatic transmission controls the shifting of the transmission in dependence on the load and the vehicle speed. Under particular shifting and other operating conditions, undesired jolts may occur. When shifts take place under load, the friction elements in the transmission may be subject to excessive wear.

THE INVENTION

It is an object of the present invention to furnish a system whereby motor control units designed for operation with manual transmissions can be used with little or no modification to decrease the jolt and/or the wear on friction elements during shifting of an automatic transmission.

In accordance with the invention, the transmission control unit furnishes a motor instruction signal when the operation of the motor is to be modified to prevent the above-mentioned jolts and/or wear of friction elements. In general, a decrease in motor torque is to be effected in response to the motor instruction signal. Connecting means are then provided which cause a modification in the input or output signals of the motor control unit such that the desired change in operation of the motor occurs.

The decrease in jolts is particularly strong if the motor instruction signal is not present throughout the whole shift operation but its duration depends upon the operating conditions of the motor and the transmission. It is desirable that the change in the operating parameters of the motor starts only after the start of the shifting process and, more particularly, at a time when the coupling or brake to be released is already completely released, but before the time during which a rotating part of the transmission changes its direction of rotation and is then generally blocked by a freewheel. The motor speed, or the input speed to the transmission, at which the change in the operation of the motor is to be initiated and terminated can be determined from U.S. patent application Ser. No. 089,465, assigned to the same assignee and incorporated herein by reference. The present invention is an improvement on the invention set forth in the incorporated patent application. Specifically, it allows application of the signal furnished in the previous case to different types of motor control units.

Preferred embodiments of the invention are claimed in the dependent claims. The embodiment claimed in claim 4 is particularly relevant for motor control units which control injection apparatus or the ignition system. When such a motor control unit is used in a drive system having a manual transmission,[1] it contains only a single storage, for example an electronic storage. The storage is addressed by motor control input signal signifying the then-present motor load, motor torque, and other relevant parameters. The storage location addressed by these signals then contains data which signifies the desired ignition angle, or the desired amount of fuel to be injected. In accordance with the present invention, a second storage is then provided and, in response to the motor instruction signal, the second storage rather than the first is addressed by the motor control input signals. Alternatively, more than one additional storage can be provided and the transmission control unit can furnish different motor instruction signals which cause the addressing of different ones of the newly provided storages. The switch which selects the particular storage can be incorporated into the motor control unit.

[1] as disclosed in Bosch Technische Berichte 5(1977), 5/6, pp. 250–256 and in Bosch Automotive Handbook (1976), pp. 283–286.

In the system claimed in claim 1, the pulses constituting the motor input signal are delayed, thereby affecting the operation of the motor. The motor input pulses in this embodiment may, for example, be timing signals which specify the ignition timing in the ignition system controlled by the motor control unit. The timing signal may, for example, be a signal signifying top dead center as derived from signals furnished by a gear coupled to the crankshaft. Alternatively, the timing signal may be derived from a special signal generator operated by a mechanical distributor. When the timing signal is delayed, a corresponding delay in spark generation occurs. The delay in spark generation may be a delay by a fixed time interval. However, the embodiment may be further improved by varying the actual time delay in dependence on the particular operating conditions of the engine and of the transmission.

The embodiment claimed in claim 5 is particularly useful in conjunction with motor control units which control the operation in the motor by pulse width modulation. For example, the motor control unit may be an injection control unit which controls the amount of fuel injected during each cycle by varying the time interval during which the fuel is injected.

The embodiment claimed in claim 7 is particularly applicable to motor control units which furnish a motor control output signal which is an analog signal. For example, the motor control unit may be one which is controlled by a small microcomputer and which, through a servo drive, varies the throttle valve position in dependence upon the motor operating conditions and the position of the gas pedal. The control is such that the cleanest possible emission from the engine results. The motor instruction signal then results in the generation of an analog correction value which is combined with the analog output signal of the motor control unit. The so-combined signals then regulate the position of, for example, the throttle valve.[1] In another embodiment, the correction value is applied to the closed loop control circuit which regulates the position of the control element (e.g. throttle valve) in response to the motor control output signal.
[1] as disclosed in PCT application No. U.S. 78/00026.

In a further preferred embodiment in which the motor control output signal is also an analog signal, the latter is used to control the charging power of a compressor or a turbo super charger charging the motor.[1] The change in the charging power can take place in a number of ways, for example by control of a valve which in turn controls the air flow from the compressor to the motor.
[1] as disclosed in Automobilrevue No. 34(1978), pp. 33ff.

In a further preferred embodiment, the motor control unit electromagnetically controls the operation of the valves of the motor. In other words, a camshaft is not used. The generation of the motor instruction signal then causes the operation of the valves to be such that those associated with one or more cylinder are maintained in the open position. The motor torque is thus decreased since the relevant cylinder does not furnish any power.

DRAWINGS ILLUSTRATING A PREFERRED EMBODIMENT

FIG. 9b shows the variation with respect to time of a number of signals in the circuit of FIG. 9a;

FIG. 10a is a simplified circuit diagram of an alternate embodiment of an arrangement for delaying ignition pulses;

FIG. 10b shows the variation with respect to time of different signals in the apparatus shown in FIG. 10a;

FIG. 11b shows the variation with respect to time of different signals in the apparatus illustrated in FIG. 10a.

The actual motor, and internal combustion engine, which is part of the drive system in a motor vehicle is not illustrated in any of the figures. Also not illustrated is the automatic transmission. Illustrated in the various figures are the transmission control unit and the motor control unit as well as the interconnection between the two.

Figure 1:
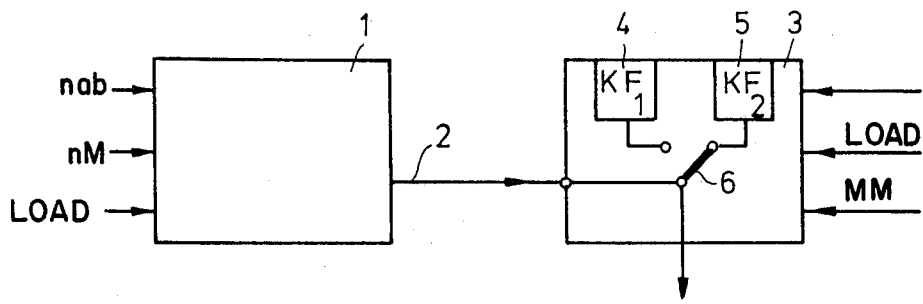
FIG. 1 is a block diagram of a transmission control unit and a motor control unit for controlling ignition or fuel injection.

The transmission control unit is denoted by reference numeral 1 in FIG. 1. It is connected through a control line 2 to the motor control unit 3. In the particular embodiment it is assumed that the motor control unit controls the ignition in an Otto motor or the injection in an Otto motor or a Diesel motor. The gear control unit receives input signals from various sensors which are not illustrated. The transmission output speed is denoted by nab, the motor speed is denoted by nM, while the third input signal signifies the load, that is the position of the accelerator. The gear control unit generates signals controlling gear shifts in dependence upon so-applied input signals. The generation of such gear control signals for the automatic transmission, that is signals which control the operation of the different clutches and brakes in the correct sequence and which also control the pressure required for operation of these friction elements is not part of the present invention and will not be discussed in detail here. The transmission control unit also generates the motor instruction signal which is a subject of the present invention. Specifically, the motor instruction signal indicates the time duration during which the operation of the motor is to be affected to reduce possible jolt, and wear of the friction element. Such modification of motor operation is generally an operation to decrease the motor torque. Such a decrease in motor torque dampens the rate of increase of torque resulting from the engagement of a freewheel in the automatic transmission and thereby decreases the jolt and decreases the slippage time of friction elements. For the embodiment shown in FIG. 1, the motor control unit includes at least two storages 4 and 5 as well as a selector switch 6 which selects one of the two storages. Motor control unit 3 receives input signals indicative of engine load, motor torque MM and, possibly additional input signals indicative of the then-present value of, for example, ambient conditions. Specific storage locations are addressed by the combination of the motor control input signals. Stored at the so-addressed location is data which indicates the desired ignition timing or the particular amount of fuel injection required for the then-present operating conditions. In response to the motor instruction signal, switch 6 switches to the other storage. The data stored in the second storage is chosen in such a way that, for the particular operating conditions, the motor torque is decreased by an amount experimentally determined by the manufacturer of the motor to yield the optimum results.

Figure 5:
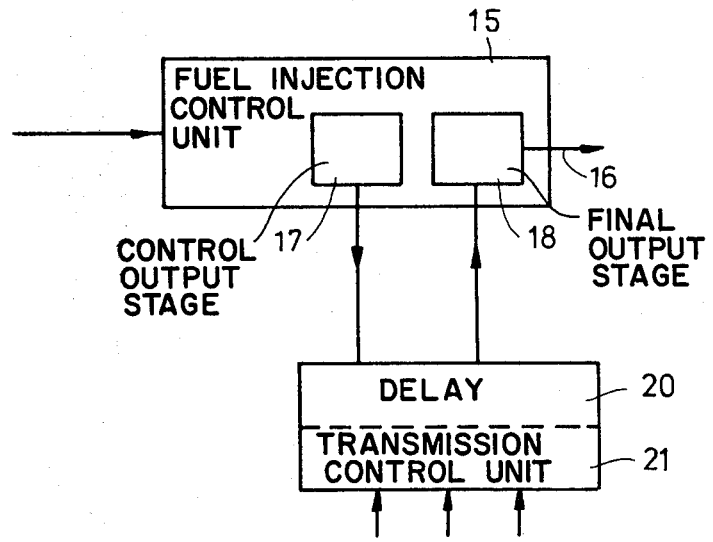
FIG. 5 is a schematic diagram showing apparatus for affecting the time duration of the injection in fuel injection apparatus.

Both the time duration of the motor instruction signal and its start relevant to the start of the gear shift operation vary as a function of the particular shifts being carried out and of the then-present operating conditions of the motor. In many cases the timing of the furnishing of the motor instruction signal is such that the motor operation is affected shortly before the time at which an element of the planetary gearing which changes its direction of rotation after initiation of the shifting process is blocked by a freewheel. Alternatively, the timing of the motor instruction signal may be such that the operation of the motor is affected shortly after a freewheel or friction element releases and torque is transmitted through a slipping friction element. The end of the intervention with the motor operation takes place shortly thereafter, that is shortly after the rotating element has been blocked or shortly before the slipping friction element engages completely. The timing of the generation of the motor instruction signal under consideration of the then-present synchronous speed at the transmission input is described in detail in the patent application incorporated by reference herein. Reference is made in particular to FIG. 5 of the cross-referenced application.

Figure 2:
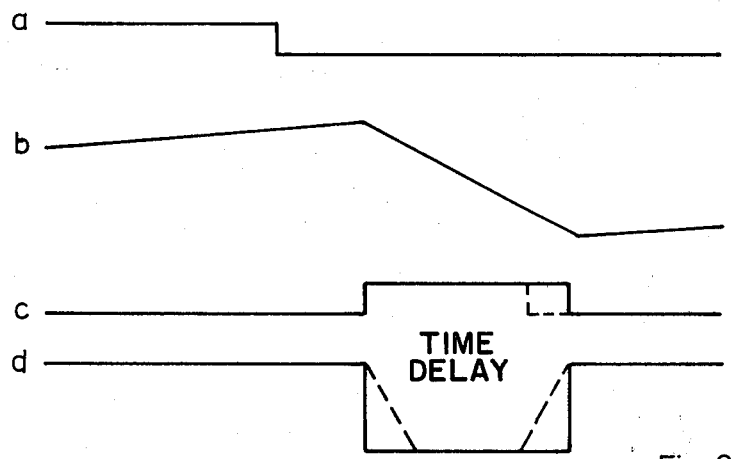
FIG. 2 is a timing diagram showing the timing of the operation of the system of FIG. 1.

In FIG. 2, the downward step illustrated in line a indicates a shift command generated in the shift control unit which causes an upshift of the transmission from, for example, second to third gear. It will be assumed that an upshift under load is taking place. A certain dead time exists after the receipt of the shift command. This is required so that the clutches associated with the new gear may be filled. Thereafter the coupling associated with the new gear begins to transmit an ever-increasing torque. This causes the torque transmitted through a freewheel to another clutch activated prior to the gear shift to decrease until the freewheel finally releases. As long as the freewheel is still blocked, the old gear ratio exists and no changes in motor speed take place. In FIG. 2b, the leftmost portion of the curve, which indicates the input speed of the transmission, is illustrated as increasing slightly, that is the vehicle accelerates. Line c illustrates the motor instruction signal. This is initiated a short time after the above-mentioned freewheel has released, that is no longer transmits torque. In line d, the decrease with respect to time of the motor torque which is effected by the receipt of the motor instruction signal is illustrated. The slipping clutch causes the motor to be braked to the synchronous speed which results from the then-present vehicle speed and the gear ratio in the newly selected gear. When the motor reaches this synchronous speed, the coupling engages fully and, at the latest at this time or, preferably, shortly before, the intervention with the motor operation due to the motor instruction signal must be terminated. The intervention with the motor operation due to the motor instruction signal allows the pressure of the slipping clutch to be decreased relative to that which would be present without such motor intervention. This increases the comfort during shifting without excessively increasing the slippage time. As illustrated in line d, it may be preferable to change the motor torque slowly both at the beginning and at the end of the intervention process, rather than carry this change out instantaneously. In the embodiment shown in FIG. 1, the intervention with the motor operation in the direction decreasing the motor torque is carried out by changing of the ignition timing or changing of the amount of fuel injected. It of course could be carried out in other ways, as already mentioned.

Figure 3:
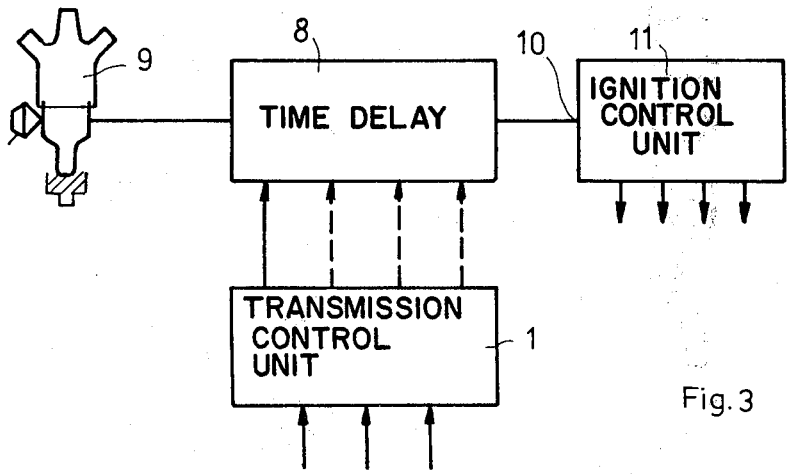
FIG. 3 is a schematic diagram illustrating another embodiment of the system of the present invention used in conjunction with ignition control.
Figure 4:
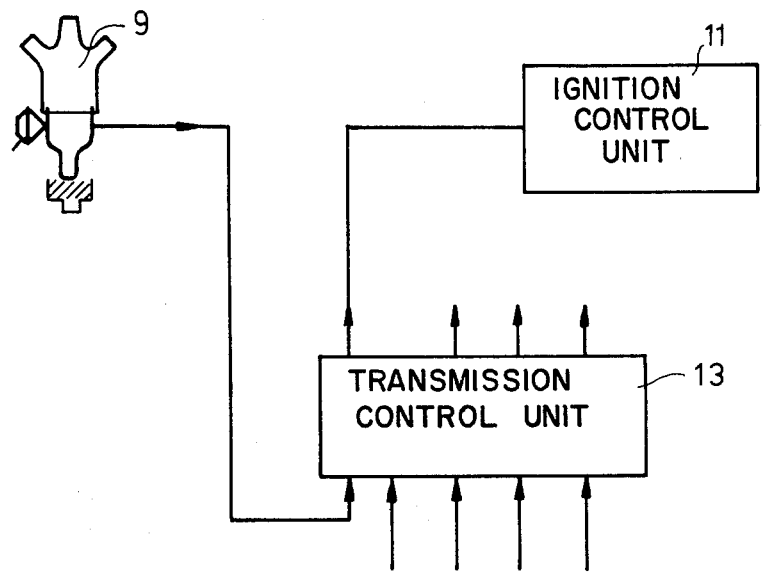
FIG. 4 is a variation of the apparatus illustrated in FIG. 3.

In the system shown in FIG. 3, transmission control unit 1 is coupled to a time delay 8 which is interconnected between timing signal generator 9 and an input 10 of motor control unit 11. Motor control unit 11 for this embodiment is an ignition control unit. The signals generated by signal generator 9 are so delayed in response to the motor instruction signal, that the motor control output signals furnished by motor control unit 11 cause a delay in the ignition timing in the motor and therefore a decrease of the output torque of the latter. In the arrangement shown in FIG. 3, the gear control unit is connected to the time delay apparatus 8 through one or more control leads, so that one or more delay times may be switched in. The apparatus shown in FIG. 4 may be considered as embodying apparatus which may result from a constructional integration of transmission control unit 1 and time delay 8 of FIG. 3. The line connecting the timing signal generator 9 to motor control unit 11 is divided into two parts. The first connects the output of the timing signal generator to an input of transmission control unit 13. The second connects an output of transmission control unit 13 to the input of motor control unit 11. As will be explained in greater detail below, the apparatus in FIGS. 3 and 4 can be designed to delay the timing signal by a constant time interval so that the ignition timing delay angle changes as a function of engine speed, or, alternatively, the time delay can vary as a function of motor speed so that a constant or predetermined ignition angle change takes place for changing engine speeds. It is to be understood that the final quantity to be affected is the motor control output signal, so that instead of delaying the motor control input signals it would be possible to apply the delay to signals generated within motor control unit 11 so that the desired delay in the motor control output signals takes place.

In the apparatus shown as FIG. 5, the motor control unit is an injection control unit. Specifically, the amount of fuel injected is changed by changing the time interval during which the fuel injection takes place. The injection control unit 15 has an input for receiving a signal indicative of the then-present motor load. This signal is an analog signal which is changed into a pulse sequence within motor control unit 15. This pulse sequence then appears at output 16 of unit 15 and is applied to the injection apparatus. The pulse width of the pulses at output 16 of motor control unit 15 controls the duration of the individual injection processes. A block 17 within motor control unit 15 is denoted as control output stage, while a block 18 is denoted as final output stage. In the known embodiments of the motor control units, these stages are directly connected to one another. However, in the motor control unit used for the present invention, the output of block 17 is applied to a time delay stage 20 which, in turn, is controlled by transmission control unit 21. As indicated in FIG. 5, the time delay stage and the transmission control unit may be one building block. The delay stage 20 is so designed that it delays only the leading edge of the pulses at the output of block 17. The trailing edges are not affected. The time delay only takes place when the transmission control unit furnishes the motor instruction signal. Thus, in response to the motor instruction signal, the pulse width of the pulses at the output of unit 17, the input of unit 18 and, therefore at the output 16 of motor control unit 15 is decreased. The amount of fuel injected is similarly decreased. It must be understood of course that the pulse width of the injection pulses can be decreased in other ways than the one detailed above.

Figure 6:
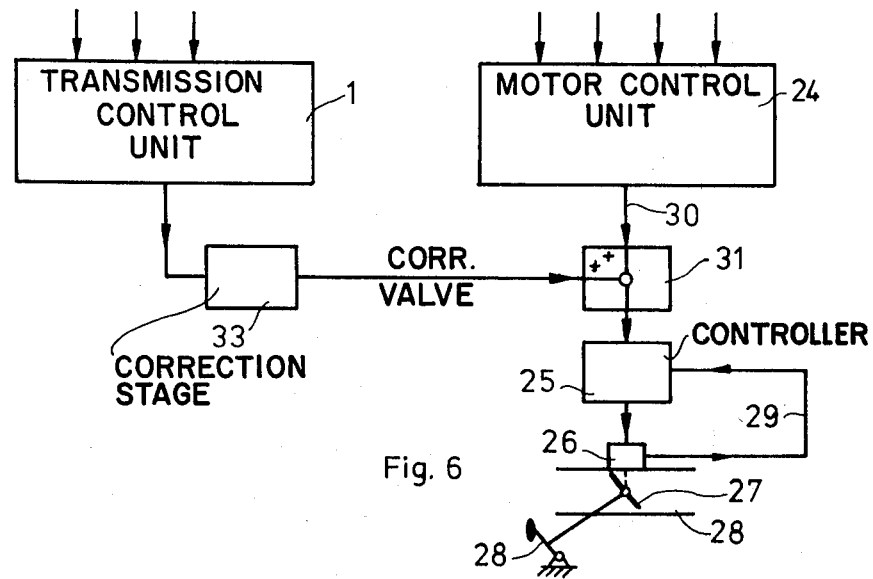
FIG. 6 is a schematic diagram of the system of the present invention used in conjunction with a motor control unit controlling the operation of the throttle valve.

In the arrangement of FIG. 6, motor control unit 24 includes a small calculator which, in response to input signals signifying the various applicable parameters such as load and motor speed generate signals on a line 30 which, in turn, are applied to a closed loop regulating stage including controller 25 and a servo motor 26. The output of servo motor 26 controls the position of throttle valve 27 in the inlet pipe 28 of a carburetor so that optimal combustion takes place. As shown in FIG. 6, throttle valve 27 is also connected to the gas pedal 28 of the vehicle. A line 29 connects motor 26 to controller 25. The signal on line 29 is a signal signifying the then-present value of the throttle valve position. A summing circuit 31 has a first input connected to line 30 and an output connected to controller 25. The second input to summing circuit 31 is connected to the output of a correction signal generator 33 whose input is connected to receive the motor instruction signal from transmission control unit 1. The correction signal generator for example may furnish a DC signal having a predetermined amplitude in response to the motor instruction signal. If the motor instruction signal is an analog signal having differing amplitudes under different operating conditions, then the unit 33 may contain a plurality of threshold circuits, each furnishing a predetermined DC output signal in response to a particular amplitude of the motor instruction signal. Thus a correction signal is furnished in response to a motor instruction signal. Since reference numeral 1 is used for the transmission control unit, it is indicated that the transmission control unit for the embodiment in FIG. 6 is the same as that used in the embodiment of FIG. 1. It should also be noted that instead of applying the correction signal (or correction value) to a summing circuit as indicated in FIG. 6, this value could be applied to controller 25, i.e. to change the value of the signal on line 29 or to the signal transmitted from controller 25 to motor 26. In any case, the arrangement is such that, in response to the motor instruction signal, the output torque of the motor is decreased.

Figure 7:
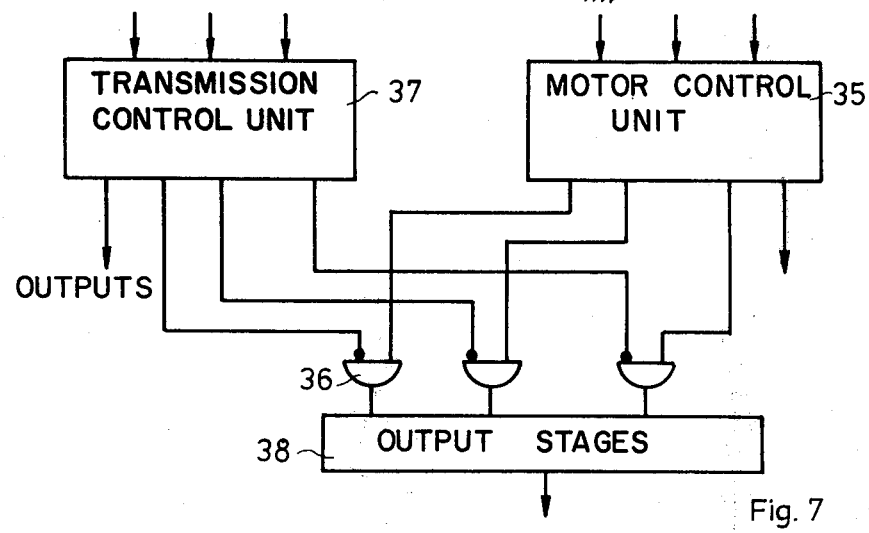
FIG. 7 illustrates the present invention in apparatus for preventing ignition or fuel injection for specific cylinders of the engine.

In the arrangement of FIG. 7, a motor control unit 36 is provided which either controls the ignition timing, or the amount of fuel injected, or both. However, in this case, the intervention with the motor is not an intervention regarding the timing of the ignition time or the amount of fuel injected. On the contrary, in this embodiment the ignition and/or the fuel injection for a predetermined number of cylinders, that is at least one cylinder and, at the most, all cylinders, is interrupted in response to the motor instruction signal. For Otto motors it is generally desirable to interrupt the fuel supply upon interruption of ignition. In order to effect the interruption of the ignition process and/or of the fuel supply, a plurality of output lines of motor control unit 35 is connected as inputs to a corresponding number of AND gates 36. The second inputs of AND gates 36, namely inverting inputs, are connected to outputs of transmission control unit 37. In the absence of the motor instruction signal, all AND gates 36 are conductive. For individual sets of particular operating conditions, the number of cylinders to be deactivated is selected by energizing the corresponding output lines of transmission control unit 37 with a "1" signal. These "1" signals constitute the motor instruction signals for this embodiment. Whenever such a motor instruction signal is provided, the corresponding AND gate is blocked. The outputs of the AND gates control output stages 38 which are power amplifiers, the output of which is applied to the actual injection system.

Figure 8:
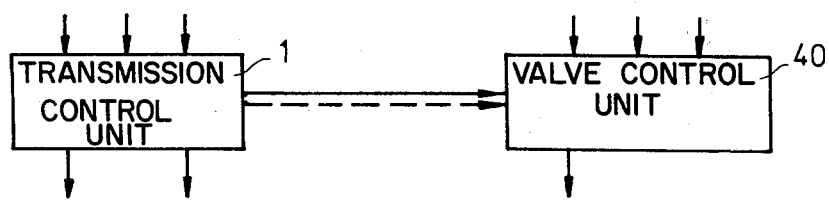
FIG. 8 shows apparatus for maintaining specific valves associated with specific cylinders in the open position.

In FIG. 8, a motor control unit 40 is provided which controls the opening and closing of valves of the motor. For this embodiment the valves are not controlled by the camshaft. For the illustrated embodiment, the intervention with the motor operation will take place in response to a motor instruction signal furnished by transmission control unit 9 in that the valves of one or more cylinders are maintained in the open position so that no power is generated in these cylinders. It may also be useful to interrupt the fuel supply to a so-deactivated cylinder. Further, as also indicated in FIG. 8, the transmission control unit 1 may furnish a number of motor instruction signals on a number of lines so that a different number of cylinders may be deactivated for different gear shifts and different motor operating conditions. In any case, the deactivation of the cylinders takes place by maintaining the associated valves in an open position.

Figure 9A:
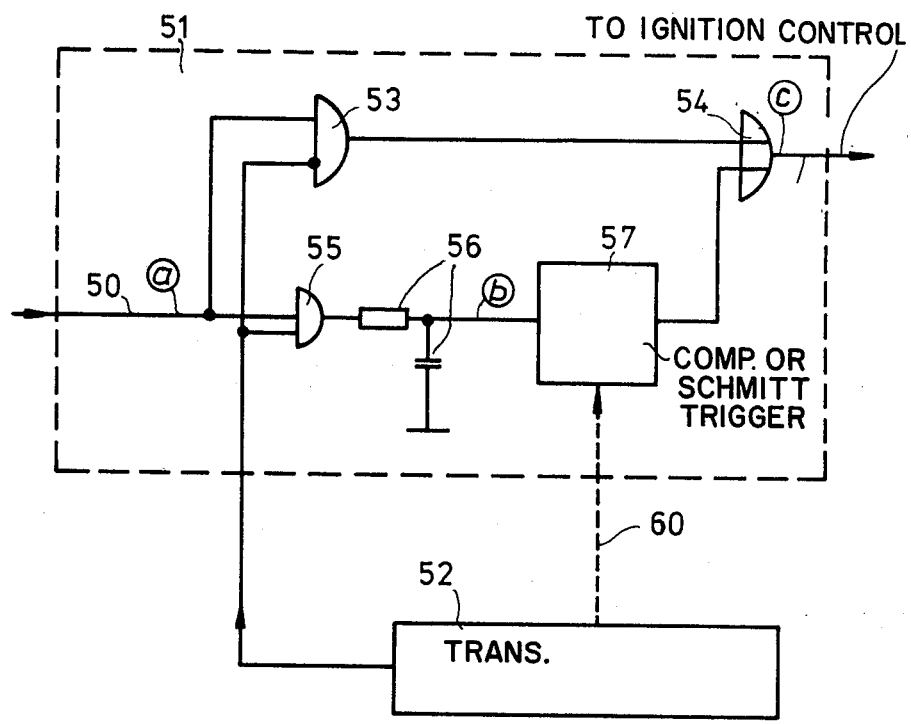
FIG. 9a is a simplified circuit diagram for apparatus delaying the furnishing of ignition signals.
Figure 9B:
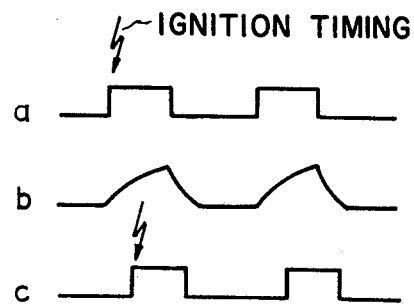

In the arrangement shown in FIG. 9a, a timing signal is applied to an input 50 of a delay circuit 51. As long as no motor instruction signal is furnished by transmission control unit 52, the timing signal is transmitted directly from input 50 through AND gate 53 and an OR gate 54 to the output of the delay circuit 51. From the output of delay circuit 51 this signal is directly applied to the ignition unit. However, when the gear control unit 52 furnishes a motor instruction signal, AND gate 53 is blocked and the timing signal from input 50 is transmitted through an AND gate 55 and an RC circuit 56 to the input of a comparator or Schmitt trigger 57. When the signal applied to stage 57 exceeds a predetermined amplitude, it furnishes a threshold output signal to another input of OR gate 54. The signals on line 50 are substantially rectangular pulses (for example see curve a in FIG. 9b) which are changed into approximately triangular signals illustrated in line b of FIG. 9b. The start of the threshold output signal is therefore delayed relative to the leading edge of the timing signal on line 50, as is illustrated in line c of FIG. 9b. If the threshold value (or comparator value) of unit 57 remains unchanged regardless of the gear shift being carried out, then a fixed time delay between the application of the timing signal on line 50 and actual ignition results. Thus, for different motor speeds, the ignition angle will vary. However, as illustrated by the dashed line 60 in FIG. 9a, the threshold value of stage 57 may be changed as a function of motor speed, so that a predetermined ignition angle change takes place independent of the motor speed.

Figure 10:
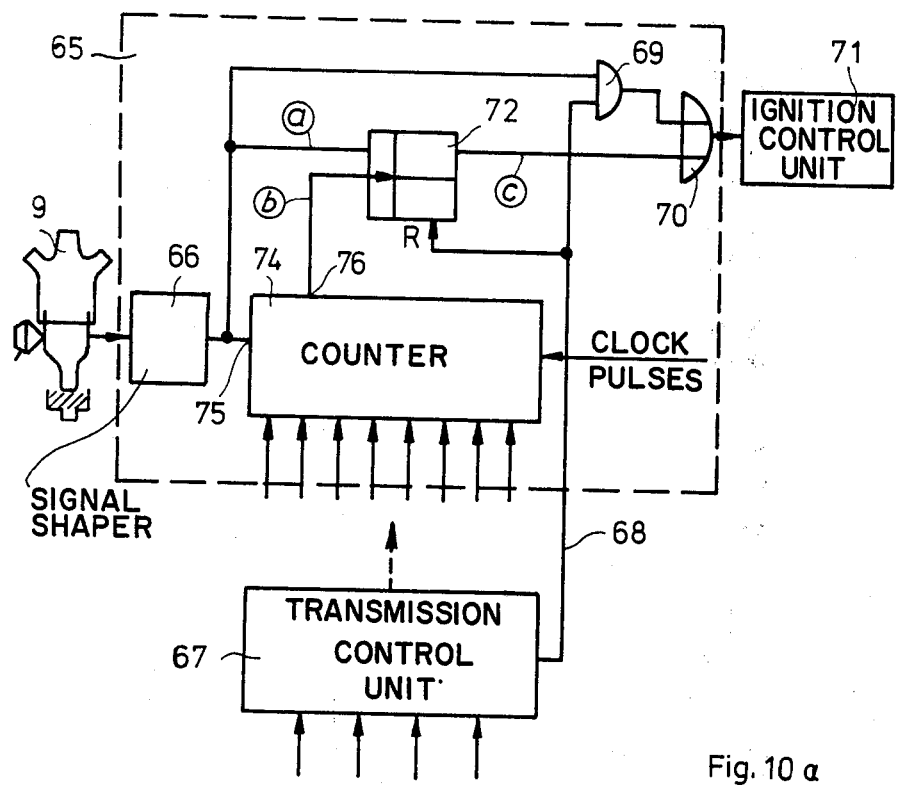
Figure 10:
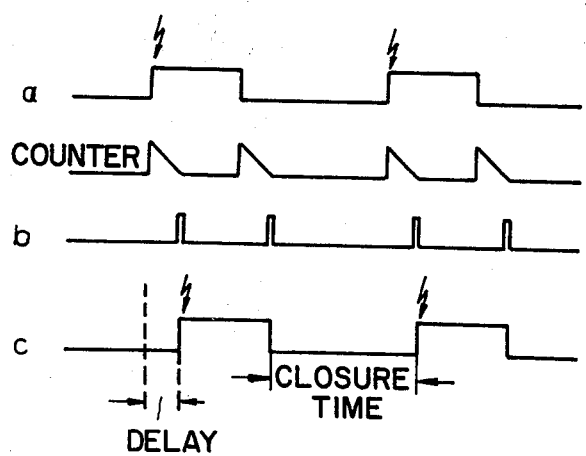

In the arrangement shown in FIG. 10a, the timing signal generated by a timing signal generator 9 is applied to an input of a time delay circuit 65. The output signals from timing signal generator 9 are, if necessary, shaped into rectangular pulses by a signal shaper 66. For this embodiment, the motor instruction signal is a "0" signal on line 68 which is connected from the output of transmission control unit 67 to the reset input of a flip-flop 72 and the first input of an AND gate 69. In the absence of the motor instruction signal, line 68 carries a "1" signal. In this case, the signal at the output of signal shaper 66 passes directly through AND gate 69 and an OR gate 70 to motor control unit 71 which controls the ignition timing. Since the "1" signal on line 68 is applied to flip-flop 72 on a continuous basis, this flip-flop is inoperative. However, upon furnishing of the motor instruction signal, that is of a "0" signal on line 68, AND gate 69 blocks. The signal from the output of signal former 66 can no longer be transmitted directly to motor control unit 71. Flip-flop 72 is now in the operative condition. Simultaneously with generation of the "0" signal on line 68, a signal is generated by gear control unit 67 which allows presetting of a counter 74 for each signal change at an input 75 of counter 74. Input 75 of counter 74 is directly connected to the output of signal shaper 66. A clock signal having a frequency substantially exceeding the rotational frequency of the motor and proportional thereto is also applied to counter 74. This motor proportional signal can be derived from the starter gear. Counter 74 counts backwards to zero in response to the clock signals. As soon as the count of zero has been reached, i.e. as soon as the second predetermined count is present on the counter, a signal appears at output 76 of the counter. Signals are applied to the clock input of JK flip-flop 72. Further, the output of signal shaper 66 is connected to one signal input of flip-flop 72 as well as the above-mentioned input 75 of counter 74. The output of flip-flop 72 is connected to the second input of OR gate 70.

The signal at output 76 of counter 74 causes the information at the signal input of flip-flop 72 to be transferred to its output. As soon as a signal change occurs at input 75 of counter 74 following the generation of the signal at output 76, the counter is again preset and again starts to count in the backwards direction.

FIG. 10b shows the variation with respect to time of the signals at various points in FIG. 10a. Specifically, line a shows the signal at the output of signal shaper 66. The leading edge of this signal initiates the spark. The count on counter 74 is illustrated in the line below line a of FIG. 10b. Line b of FIG. 10b shows the signal at output 76 of counter 74, while line c shows the signal at the output of flip-flop 72. It will be noted that the signal at the output of flip-flop 72 has the same pulse width as the signal at the output of pulse shaper 66. However, its leading edge is delayed by a predetermined delayed time, namely the time which is required for counter 74 to count from the preset number to zero. Since the clock pulses applied to the counter have a frequency which is proportional to the frequency of the motor speed, the time for the counter to accomplish the above-mentioned count is shorter the higher the speed of the motor. Thus, when the motor instruction signal is furnished, denoting that an intervention in the normal operation of the system must take place, the angle by which the ignition timing is moved is a constant angle, independent of speed.

In FIG. 11, the connecting stage 80 is connected between a motor control unit which generates injection pulses and the actual injection circuit. In response to the motor instruction signal from the automatic transmission control unit 81, circuit 80 operates to decrease the pulse width of the signals applied thereto, thereby shortening the injection time. Connecting circuit 80 includes a presettable counter 82 which counts backwards from a preset value to zero at a clock frequency which is constant and much higher than the rotational speed of the motor. Motor control output signals (injection pulses) are furnished on a line 83 and, in the absence of a motor instruction signal, are transferred directly to output 85 of stage 80 through an AND gate 84. The injection pulses on line 83 are also applied to one input of an AND gate 86 whose output is connected to an input 87 of counter 82. When the signal at input 87 changes from a "0" signal to a "1" signal, the counter is preset to the desired value. The other input of AND gate 86 is connected to an output of transmission control unit 81 which furnishes the motor instruction signal. Specifically, a "1" signal is furnished when intervention with the motor operation is to take place. The transmission control unit 81 also supplies the value to which counter 82 is to be preset. This value is computed on the basis of the then-present motor operating conditions and the type of shift to be carried out.

The signal at output 88 of counter 82, which is connected to the second input of AND gate 84, carries a "1" signal when counter 82 carries a zero count. As long as the counter is counting, a "0" signal is present at output 88 and AND gate 84 is therefore blocked.

Figure 11A:
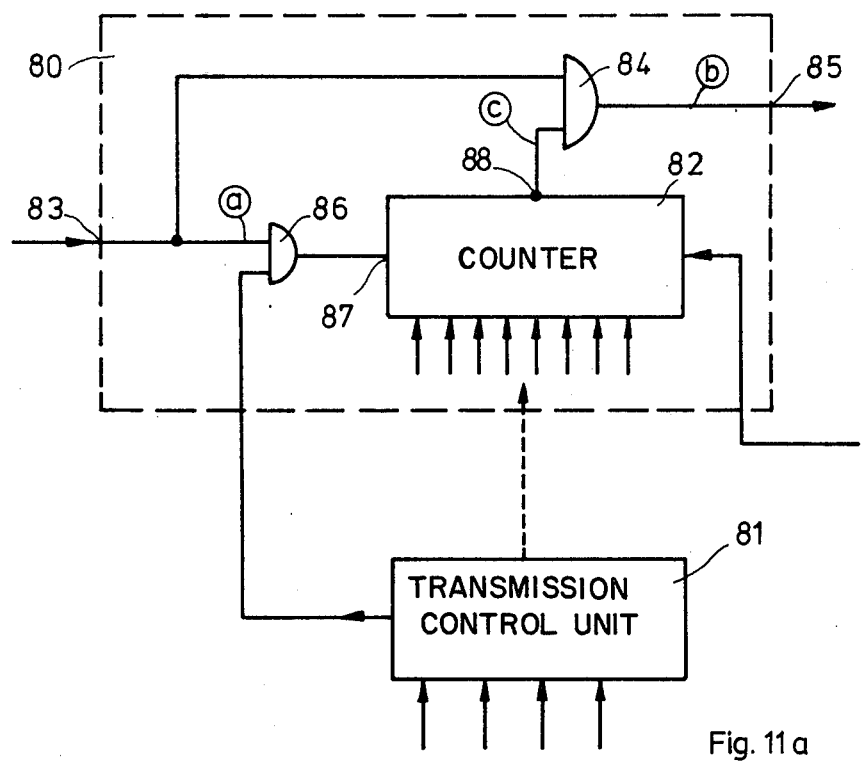
FIG. 11a is a simplified circuit diagram of apparatus for changing the time duration of fuel injection.
Figure 11B:
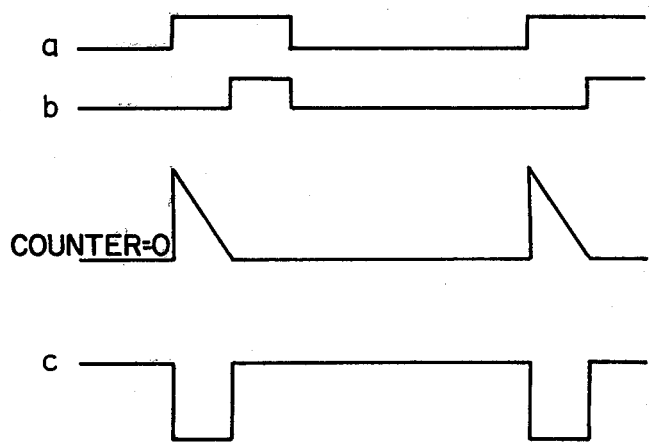

Referring now to FIG. 11b, line a shows the signal variation at input 83 of stage 80. Specifically, the injection pulses furnished by the motor control unit are shown. It will be noted that for the leading edge of the signal on line a, the counter is preset and then starts counting backwards as is indicated by the straight line of negative slope. During the time the counter is counting, the signal at the second input of AND gate 84, as shown in line c of FIG. 11b, is a "0" signal so that AND gate 84 is blocked. When the counter has again counted to zero, the signal in line c changes back to a "1" signal, allowing an output from AND gate 84. The output pulse from AND gate 84 is shown in line b of FIG. 11b. It will be noted that the leading edge of the pulses has been delayed, while the position in time of the trailing edge remains the same. The injection pulses have thus effectively been shortened.

To eliminate the need for a special clock generator as required in FIG. 11a, the clock pulses to be applied to counter 82 can be derived from the starter gear. In this case of course the clock frequency will be proportional to motor speed. Thus, if the counter were always preset to the same value, the shortening of the injection pulses would be greater the less the motor speed. If this effect of motor speed is to be compensated for, the then-present speed of the motor can be taken into consideration when the number to which counter 82 is to be preset is calculated in transmission control stage 82. Thus if the number to which the counter is preset is smaller at higher motor speeds, the same shortening of the injection time will take place, regardless of motor speed.

It should be particularly noted that, for all embodiments of the present invention, the transmission control unit which furnishes the motor instruction signal can be a circuit such as is shown in block diagram 4 in FIG. 5 of U.S. application Ser. No. 89,465, the application which has been incorporated by reference into the present application. Specifically, the output of microprocessor 67 is the motor instruction signal and may also contain the number to which a specific counter, such as counter 82, is to be preset. Such a speed varying preset number could, for example, readily be stored in ROM 68 in storage locations addressable by a signal corresponding to the then-present engine speed.

Various changes and modifications may be made within the scope of the inventive concepts.

We claim:

1. In a drive system including a motor having a shaft equipped with associated electrical components for furnishing timing signals during the rotation thereof, a motor control unit operative under control of said timing signals to furnish ignition control signals controlling operating parameters of said motor, and an automatic transmission operative in a plurality of gears, the improvement comprising:

a transmission control unit (1,11,21 ...) for controlling gear shifts in said automatic transmission, said automatic transmission control unit comprising means for generating a motor instruction signal signifying a desired change of an operating parameter of said motor during one of said gear shifts for decreasing jolts during said gear shifts; and time delay means (8,20 ...) connected to said transmission control unit for receiving said motor instruction signals and interposed between said motor control unit and said electrical components associated with said shaft for delaying the furnishing of said ignition control signals in response to said motor instruction signals.

2. Apparatus as set forth in claim 1, wherein said time delay means comprises a counter having a counting input, said counter being preset to a first predetermined number and furnishing a counting output signal when the count thereon reaches a second predetermined number, means for applying clock signals having a frequency substantially higher than the rotational frequency of said shaft to said counting input of said counter, and means (72) for delaying said timing signals in response to said motor instruction signal.

3. Apparatus as set forth in claim 2, wherein said frequency of said clock signals is proportional to said rotational speed of said shaft.

4. In a drive system having a motor, a motor control unit operative under control of motor control input signals to furnish motor control output signals controlling operating parameters of said motor, and an automatic transmission operative in a plurality of gears, the improvement comprising:

first and second storage (4,5) included in said motor control unit addressable by said motor control input signals and having motor control output signals stored therein;

a transmission control unit (1,11,21 ... ) for controlling gear shifts in said automatic transmission, said automatic transmission control unit comprising means for generating a motor instruction signal signifying a desired change of an operating parameter of said motor during one of said gear shifts for decreasing jolts during said gear shift; and connecting means connected to said transmission control unit and said motor control unit for receiving said motor instruction signal, said connecting means comprising switch means (6) for selecting said first or said second storage to furnish said motor output signals in the presence and absence of said motor instruction signal, respectively, for changing said motor control output signals to effect said change in said operating parameter of said motor.

5. Apparatus as set forth in claim 4, wherein said motor output signals are motor output pulses having a controllable pulse width; and wherein said connecting means comprises means for changing said pulse widths of said pulses in response to said motor instruction signal.

6. Apparatus as set forth in claim 4, wherein said motor comprises a plurality of valves;

wherein said motor control unit controls the operation of said valves by reference to said first and second storage; and wherein operation of said switch means cause said motor control unit to maintain at least one of said valves in the open position during the presence of said motor instruction signal.

7. In a drive system having a motor, a compressor for supercharging operative under control of motor control input signals to furnish motor control output signals controlling operating parameters of said motor, and an automatic transmission operative in a plurality of gears, the improvement comprising:

a transmission control unit (1,11,21 ... ) for controlling gear shifts in said automatic transmission, said automatic transmission control unit comprising means for generating a motor instruction signal signifying a desired change of an operating parameter of said motor during one of said gear shifts for decreasing jolts during said gear shifts; and connecting means connected to said transmission control unit and said motor control unit for receiving said motor instruction signal and for generating an analog correction signal in response to said instruction signal and for causing said motor control unit to decrease the charging power of said compressor in response to said correction signal.

8. Apparatus as set forth in claim 7, wherein said motor control unit changes the charging power of a turbo supercharger in response to said correction signal.

9. In a drive system having a motor, a motor control unit operative under control of motor control input signals to furnish motor control output pulse signals having a controllable pulse width controlling fuel injection into said motor, and an automatic transmission operative in a plurality of gears, the improvement comprising:

a transmission control unit (1,11,21 ... ) for controlling ger shifts in said automatic transmission, said automatic transmission control unit comprising means for generating a motor instruction signal signifying a desired change of fuel injection into said motor during one of said gear shifts for decreasing jolts during said gear shift; and time delay means connected to said transmission control unit and said motor control unit for receiving said motor instruction signal and delaying the leading edge of said motor control pulse signals to reduce fuel injection into said motor during the presence of said motor instruction signal.

10. Apparatus as set forth in claim 9, wherein said means for delaying said leading edge of said motor output pulses comprises a counter.

* * * * *